United States Patent [19]

Coffey et al.

[11] Patent Number: 4,964,525
[45] Date of Patent: Oct. 23, 1990

[54] ELECTRICAL BOX MOUNTING BRACKET

[75] Inventors: Donald T. Coffey; Charles H. Oltz, both of Charlotte, N.C.; Donald D. Roth; Richard J. Baran, both of Lorain, Ohio

[73] Assignee: G.B. Electrical Inc., Matthews, N.C.

[21] Appl. No.: 410,345

[22] Filed: Sep. 21, 1989

[51] Int. Cl.⁵ .............................................. H02G 3/08
[52] U.S. Cl. ...................................... 220/3.9; 248/906
[58] Field of Search ..................... 220/3.9, 3.3, 3.4; 248/906

[56] References Cited

U.S. PATENT DOCUMENTS

| | | | |
|---|---|---|---|
| 1,066,706 | 7/1913 | Caine | 220/3.4 |
| 1,206,431 | 11/1916 | Graybill | 220/3.4 |
| 1,620,063 | 3/1927 | Bowers | 220/3.4 |
| 1,705,768 | 3/1929 | Johnson et al. | 220/3.4 |
| 1,774,934 | 9/1930 | Mangin | 220/3.4 |
| 1,779,681 | 10/1930 | Smith et al. | 220/3.4 |
| 1,795,224 | 3/1931 | Mangin | 220/3.4 |
| 1,920,811 | 8/1933 | Schwabacher | 220/3.4 |
| 1,961,728 | 6/1934 | Arnest et al. | 220/3.7 |
| 2,252,953 | 8/1941 | Walters | 220/3.9 |
| 2,299,674 | 10/1942 | Austin, Jr. | 248/311 |
| 2,299,696 | 10/1942 | Gregersen | 220/3.6 |
| 2,399,491 | 4/1946 | Lindstrom | 220/3.6 |
| 2,423,757 | 7/1947 | Dedge | 220/3.9 |
| 3,448,952 | 6/1969 | Swanquist et al. | 248/27 |
| 3,606,223 | 10/1971 | Havener | 248/205 |
| 3,767,151 | 10/1973 | Seal et al. | 248/205 R |
| 3,908,074 | 9/1975 | Berg | 174/58 |
| 3,913,773 | 10/1975 | Copp et al. | 220/3.92 |
| 4,000,874 | 1/1977 | Finley | 248/27.1 |
| 4,057,164 | 11/1977 | Maier | 220/3.6 |
| 4,135,337 | 1/1979 | Medlin | 52/221 |
| 4,296,870 | 10/1981 | Balkwill et al. | 220/3.3 |
| 4,399,922 | 8/1983 | Horsley | 220/3.6 |
| 4,447,030 | 5/1984 | Nahel | 248/27.1 |
| 4,483,453 | 11/1984 | Smolik | 220/3.5 |
| 4,497,416 | 2/1985 | Smolik | 220/3.5 |
| 4,533,060 | 8/1985 | Medlin | 220/3.9 |
| 4,561,615 | 12/1985 | Medlin, Jr. | 248/27.1 |
| 4,569,458 | 2/1986 | Horsley | 220/3.6 |
| 4,572,391 | 2/1986 | Medlin | 220/3.9 |
| 4,603,789 | 8/1986 | Medlin, Sr. | 220/3.9 |
| 4,645,089 | 2/1987 | Horsley | 220/3.6 |
| 4,688,693 | 8/1987 | Medlin, Jr. | 220/3.9 |
| 4,732,356 | 3/1988 | Medlin, Sr. | 248/27.1 |
| 4,753,361 | 6/1988 | Medlin, Jr. | 220/3.6 |
| 4,757,908 | 7/1988 | Medlin, Sr. | 220/3.9 |

*Primary Examiner*—Steven M. Pollard
*Attorney, Agent, or Firm*—Hill, Van Santen, Steadman & Simpson

[57] ABSTRACT

A mounting bracket for connection to a wall stud between a pair of wall panels is adapted to mount a variety of electrical junction, outlet and switch boxes. When mounted the bracket is a cantilever which is stabilized against deleterious forces by a pair of side-mounted support legs for engaging an opposed wall panel.

8 Claims, 4 Drawing Sheets

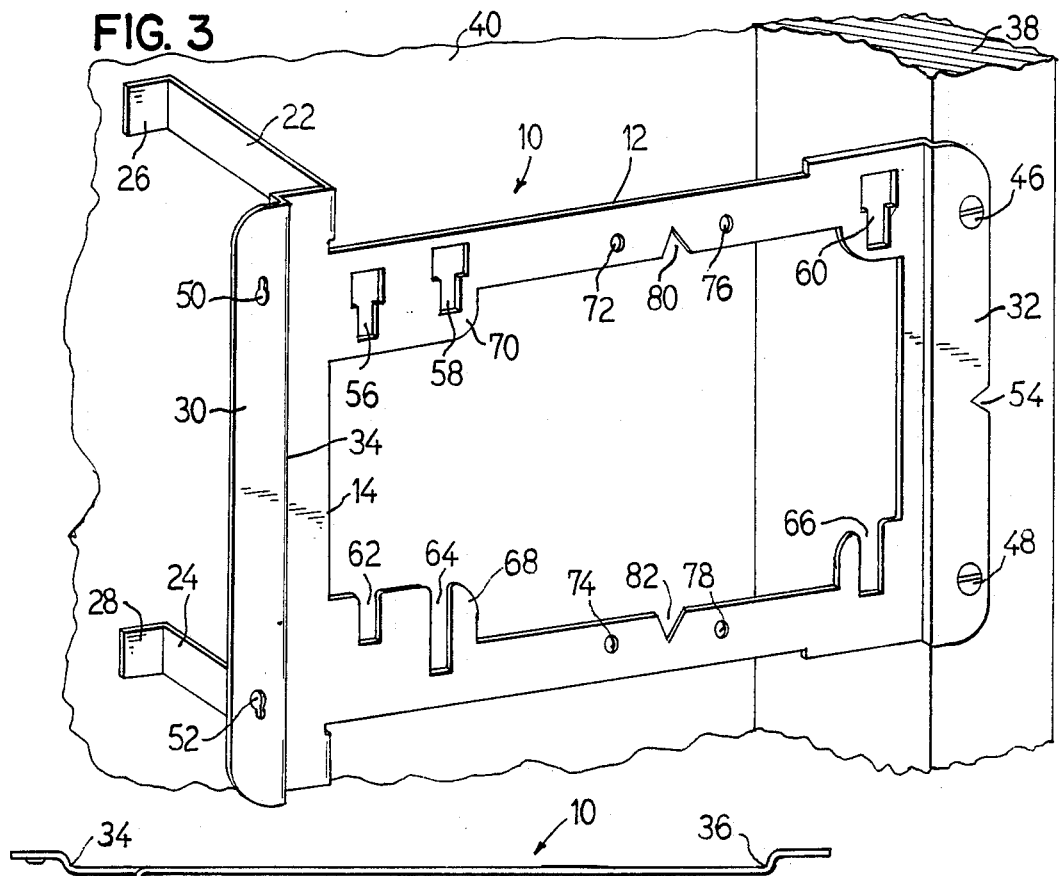
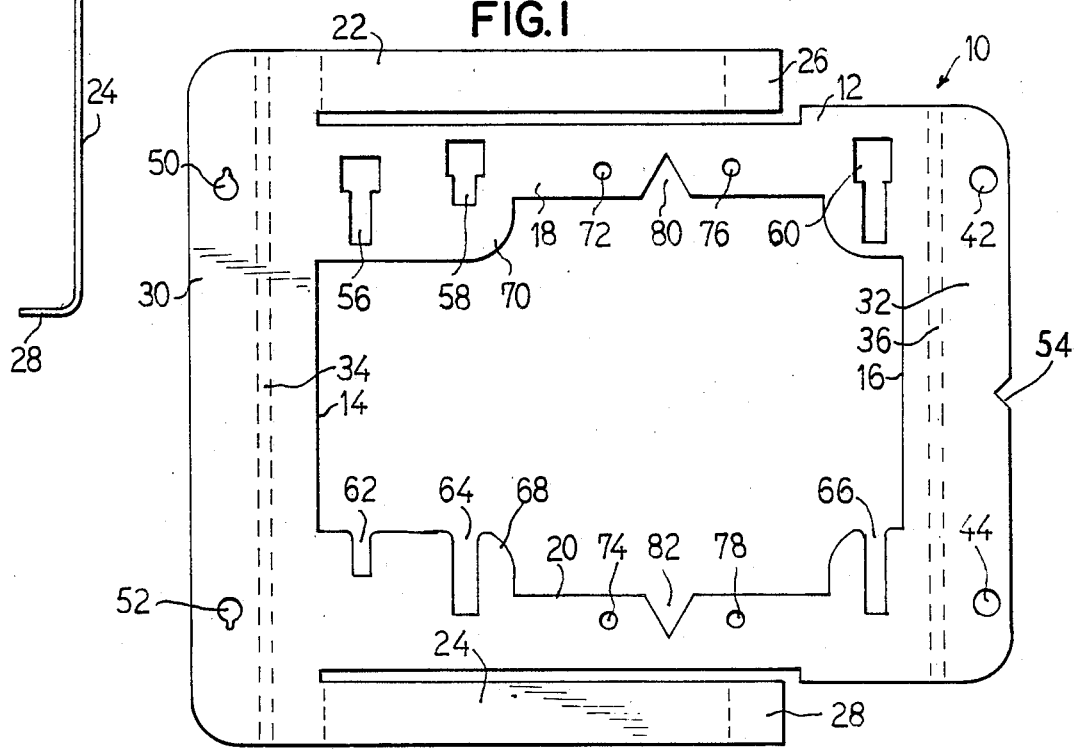

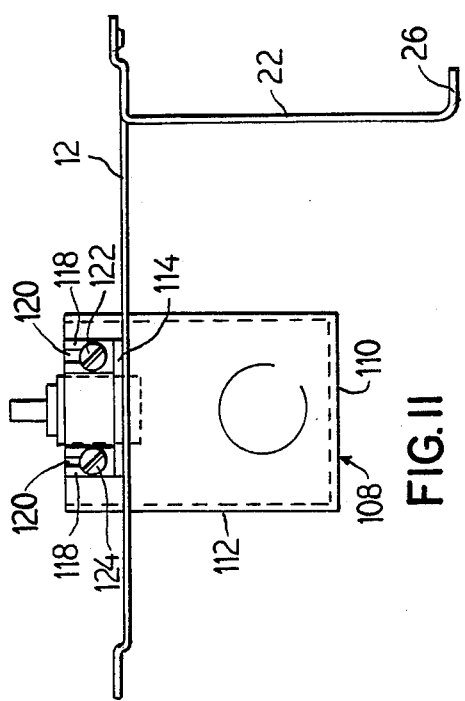
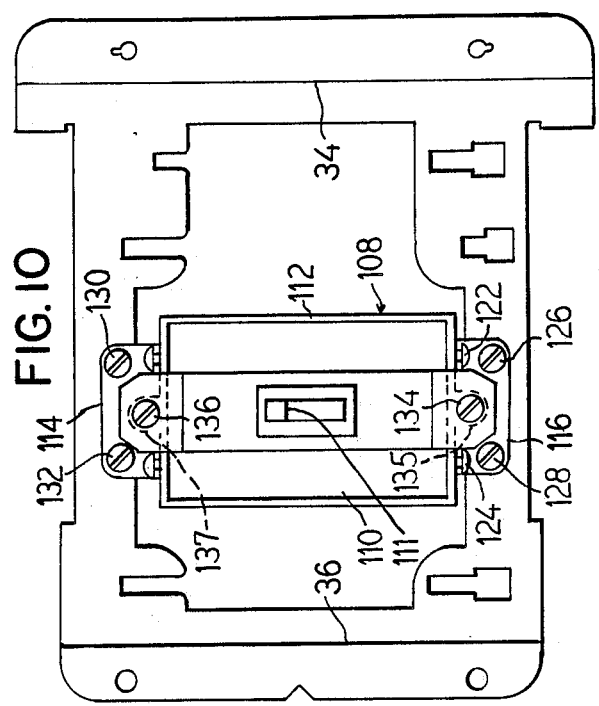
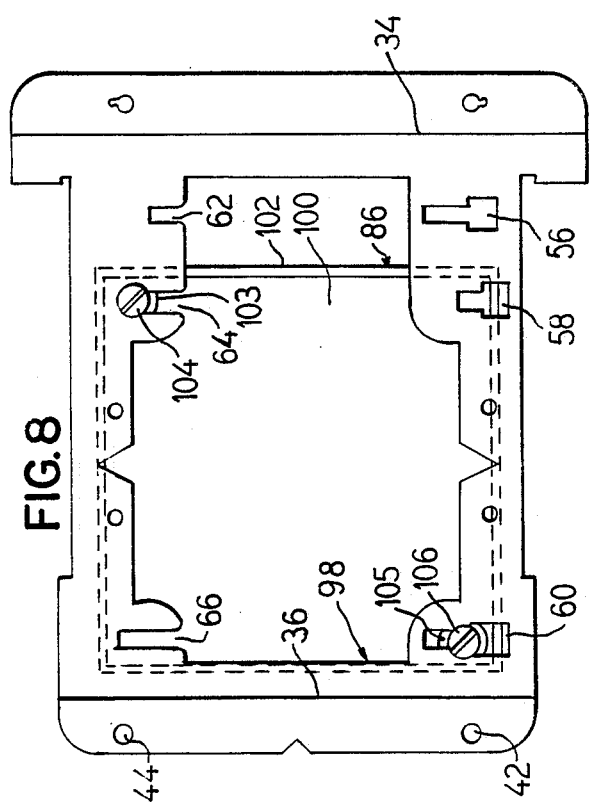
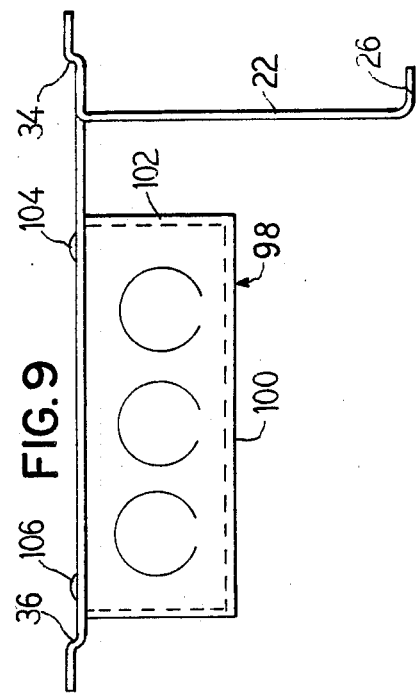

ELECTRICAL BOX MOUNTING BRACKET

BACKGROUND OF THE INVENTION

1. Field of the Invention

The present invention relates to brackets for mounting electrical equipment, and is more specifically concerned with mounting electrical outlet boxes and electrical devices such as switches and receptacles, such brackets being mounted to wall studs between front and rear wall panels.

2. Description of the Prior Art

Such mounting brackets are well known in the art for mounting outlet boxes and junction boxes, hereinafter simply "electrical boxes", and for mounting electrical devices, such as switches, receptacles and low-voltage devices as used in telephone and television.

When mounted to a wall stud, the mounting bracket forms a cantilever structure extending from the wall stud and having a lever arm which can amplify plugging and unplugging forces.

In U.S. Pat. No. 4,399,922, Horsley discloses the provision of an extension for stabilizing and supporting the bracket to stabilize the electrical box against undesirable movement. The extension in Horsley is in the form of a right angle integral plate whose outer end engages the inner surface of the opposing wall panel. The extension is scored to be broken off for use with a lesser interior wall space.

Medlin, Jr. in U.S. Pat. No 4,688,693, discloses a similar mounting bracket which has a stabilizer formed of a material which is normally removed to form the central opening of the mounting bracket.

SUMMARY OF THE INVENTION

It is the object of the present invention to provide a mounting bracket for mounting electrical boxes and electrical devices in which the mounting bracket is universal with respect to a plurality of different sizes of electrical boxes and electrical devices.

According to the invention, a mounting bracket comprises a generally planar mounting panel which is adapted at one end to be secured to a wall stud and which includes a pair of stabilizing or support legs cut and bent from the material of the mounting panel so as to extend at right angles thereto. Each of the legs includes a bent distal end for engaging and opposing wall panel.

The mounting panel comprises a central opening which is formed and defined by first and second opposed sections which are connected by third and fourth opposed sections. The first section includes holes for mounting the panel to a wall stud and the second section includes holes for alignment with the holes of the first section of a like bracket for the ganging of such brackets.

The first section and the second sections each include an offset so that the third and fourth sections are recessed to a accommodate the thickness of the heads of mounting screws, mounting tabs and the like.

The third and fourth sections include slots for receiving the shanks of mounting screws, the slots of the third section opening into the central opening and the slots of the fourth section including a first portion dimensioned so as to receive the heads of the mounting screws and a second portion for receiving the shank of a mounting screw as the box is moved along the bracket.

Inasmuch as safety is always of concern, there are no sharp corners or edges in the central opening in that all of the "corners" are rounded.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a plan view of a mounting bracket constructed in accordance with the present invention;

FIG. 2 is a bottom view of the mounting bracket of FIG.

FIG. 3 is a perspective view of the mounting bracket of FIGS. 1 and 2 as shown mounted to a wall stud;

FIG. 8 is a top view of a mounting bracket of the invention as shown with an electrical box of the first side mounted thereto, without the plaster ring;

FIG. 9 is a front view of the apparatus of FIG. 8;

FIG. 10 is a front view of a mounting bracket of the present invention showing a switch box and a toggle switch mounted thereto;

FIG. 11 is a top view of the apparatus of FIG. 10;

DESCRIPTION OF THE PREFERRED EMBODIMENTS

Figure 4:
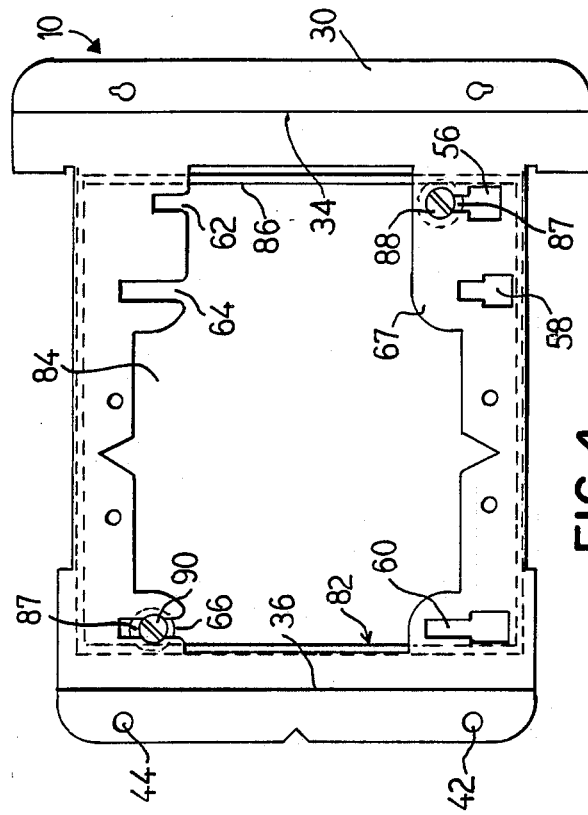
FIG. 4 is a top view of a mounting bracket of the present invention with an electrical box of a first size mounted thereto.

Referring to FIGS. 1, 2 and 3, a mounting bracket is generally illustrated at 10 as comprising a mounting panel 12 which includes a pair of opposed sections 14 and 16 connected together by another pair of opposed sections 18 and 20. A pair of stabilizing legs 22 and 24 are cut from the material of the mounting panel 12 and, as best seen in FIGS. 2 and 3, include respective distal ends 26 and 28 for engaging an opposing wall panel.

The first mounting panel section 14 and the mounting panel section 16 comprise a portion 30 and a portion 32 which are offset at 34 and 36 from the plane of the mounting panel by an amount equal to, for example, the height of the mounting screws of electrical boxes. Referring specifically to FIG. 3, the mounting bracket is shown mounted to a wall stud 38 opposite a wall panel 40. As shown, the mounting bracket constitutes a cantilever structure and is provided with stability and support by way of the pair of legs 22 and 24 whose distal ends 26 and 28 engage the surface of the wall panel 40.

Referring to FIGS. 1 and 3, the flat portion 32 comprises a pair of spaced holes 42 and 44 which, as shown in FIG. 3, receive respective mounting screws 46 and 48 for mounting the bracket to the stud 38. The holes 42 and 44 may also cooperate with thread impression holes 50 and 52 of the flat portion 30 of another, similar mounting bracket for ganging of mounting brackets, as will be discussed below.

A centering notch 54 is provided as a visual aid for ganging two or more mounting brackets.

The mounting panel 12 comprises a plurality of slots 56, 58 and 60 in the section 18 which are dimensioned at one end for receiving the heads of electrical box mounting screws and at the other ends for receiving the shanks of such screws.

The mounting panel section 20 comprises a plurality of slots 62, 64 and 66 which open into the central opening defined by the mounting panel sections.

It is standard for electrical boxes to have a bottom and a continuous sidewall extending therefrom forming a cavity and at least two diagonally located threaded tabs extending over the cavity parallel to the bottom and containing mounting screws. The boxes, in a variety of sizes, with the most popular electrical outlet boxes being 4 11/16"×4 11/16" hereinafter referred to as the large box and 4"×4", hereinafter referred to as the small outlet box. Utility and switch boxes also come in a variety of sizes of 3" and 4" height, 1 15/16" and 2⅛' width and a variety of depths. The switch boxes may have a pair of threaded tabs which extend parallel to the bottom of the switch box and over the cavity or outwardly of the box, or may have a pair of mounting ears each of which is an L-shaped structure adjustably attached to the box and has threaded holes for receiving mounting screws. As will be apparent, the bracket of the present invention serves for mounting a plurality of different types of electrical and switch boxes, selected ones of which are discussed herein.

Referring to FIGS. 1 and 3, it will be appreciated that in the interest of safety, there are no sharp edges within the central opening in that all "corners" have been rounded as indicated at 68 and 70.

In addition to the mounting slots 56-66, the section 18 includes a plurality of holes 72 and 76 and the section 20 includes a plurality of holes 74 and 78 for mounting electrical devices. As is readily apparent, additional mounting holes may be provided. Clearance notches 80 and 82 are provided for clearing the shanks of mounting screws which may be provided for mounting electrical device cover plates and the like.

Figure 5:
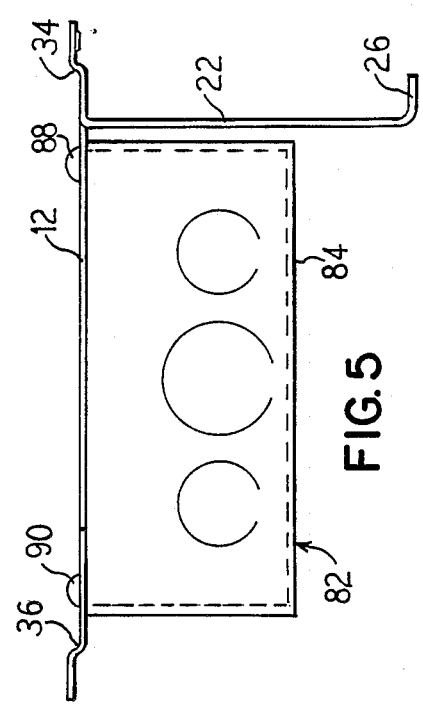
FIG. 5 is a front view of the apparatus of FIG. 4.

Referring to FIGS. 4 and 5, a large electrical box 82 is shown mounted to a mounting bracket. The electrical box includes a bottom 84 and a continuous sidewall 86 extending therefrom and defining a cavity. One or more of the sidewalls may include knockouts for receiving electrical cables therethrough.

As shown, the electrical box 82 comprises a bottom 84 and a continuous sidewall 86 extending therefrom to form a cavity. A pair of diagonally located tabs 87 extend parallel to the bottom 84 and each includes a respective mounting screw 88 or 90. The mounting screw 88 is received in the larger portion of the slot 56 and the box 82 is moved upwardly so that the shank of the screw 88 is received in the smaller portion of the slot 56 and the shank of the screw 90 is received in the slot 87. The screws may then be tightened to hold the box in place.

Figure 6:
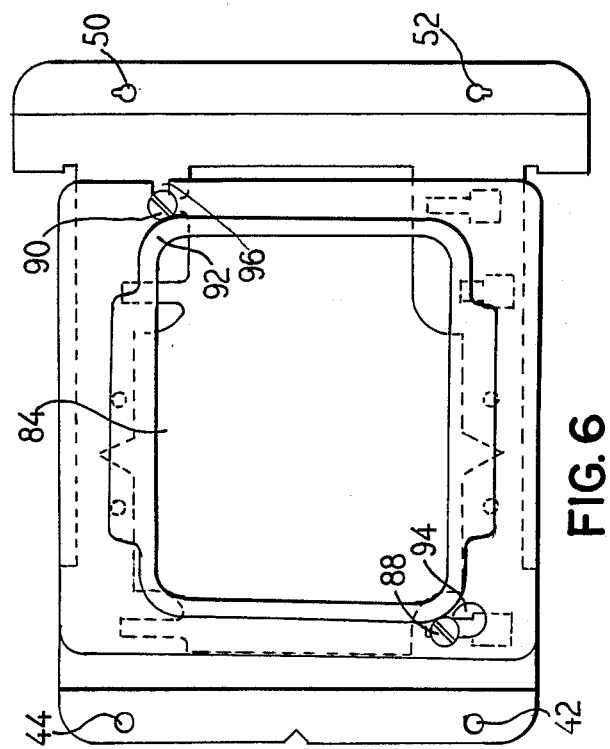
FIG. 6 is a top view of a mounting bracket of the present invention having an electrical box of the first type mounted thereto, along with a plaster ring.
Figure 7:
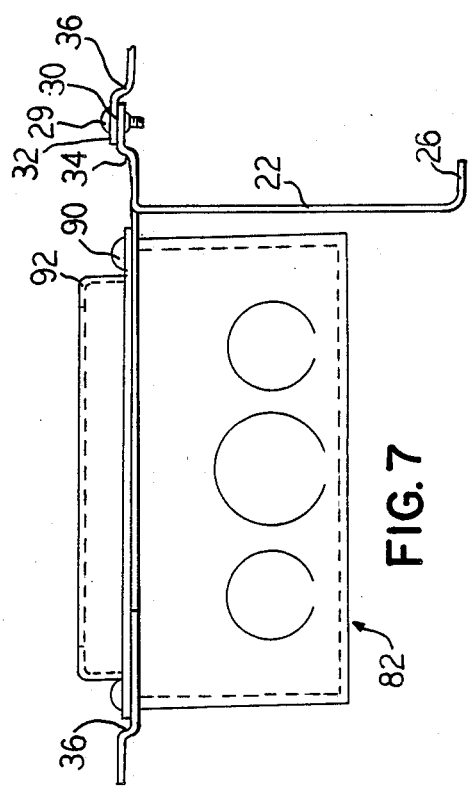
FIG. 7 is a front view of the apparatus of FIG. 6 and illustrates ganging of mounting brackets.

A similar structure is shown in FIGS. 6 and 7, additionally including a plaster ring. After the electrical box 82 is mounted as shown in FIGS. 4 and 5, a plaster ring may be mounted on the front side of the mounting bracket. The plaster ring includes a forward extending wall 92 for extending through a wall panel, such as plaster, drywall, or the like, and a peripheral flange which includes at least a pair of slots 94 and 96. As shown, the slot 94 is placed to receive the head of the mounting screw 88 therethrough and is moved so that the shank of the screw is received in the narrower part of the slot. Similarly, the slot 96 receives the shank of the screw 90.

Ganging is also illustrated in FIG. 7. As shown, the flat portion 30 of one mounting bracket is placed under the flat portion 32 of a like mounting bracket with the holes 42 and 44 aligned with the thread impression holes 50 and 52 and a respective screw 29 secures the brackets together.

Referring to FIGS. 8 and 9, a small electrical box 98 is shown mounted to a mounting bracket. Here, the electrical box includes a bottom 100 and a peripheral sidewall 102 extending therefrom to form a cavity. A pair of tabs 103, 105 extend parallel to the bottom 100 and are diagonally located opposite to that illustrated in FIG. 4 and carry mounting screws 104 and 106, respectively. Here, the tabs and screws are located on a diagonal which is opposite to that shown in FIG. 4. The head of the screw 106 is received in the large portion of the slot 60 and the box is moved downwardly so that the shank of the screw 106 is received in the narrower portion of the slot 60 and the shank of the screw 104 is received in the slot 64.

FIGS. 10 and 11 illustrate the mounting of a switch box and switch to the mounting bracket.

A switch box 108 is positioned in the central opening from the front side of the mounting panel. The switch box 108 includes a bottom 110 and a peripheral wall 112 extending therefrom to form a cavity for receiving an electrical device such as a toggle switch 111. The box 108 includes a mounting ear 114 at the top and a mounting ear 116 at the bottom. The mounting ear 114 shall be explained in detail. The mounting ear 114 is an L-shaped structure which includes a pair of feet 118 having a slot 120 therein for receiving a respective mounting screw 122, 124 for adjusting the distance the box 108 extends forward of the mounting panel. The ear 114 and the ear 116 each include a pair of threaded holes for receiving screws 126, 128 and 130, 132. The screws 126 and 128 are received in the threaded holes 72 and 76 (see FIG. 1) and the screws 130 and 132 are received in the threaded holes 74 and 78 (see FIG. 1), respectively.

A toggle switch 111 includes an upper flange and a lower flange having a mounting screw 134, 136, respectively. The mounting screws are threadedly received in threaded tabs 135, 137 which extend outwardly of the sidewall 112 and parallel to the bottom 110 of the switch box.

Figure 13:
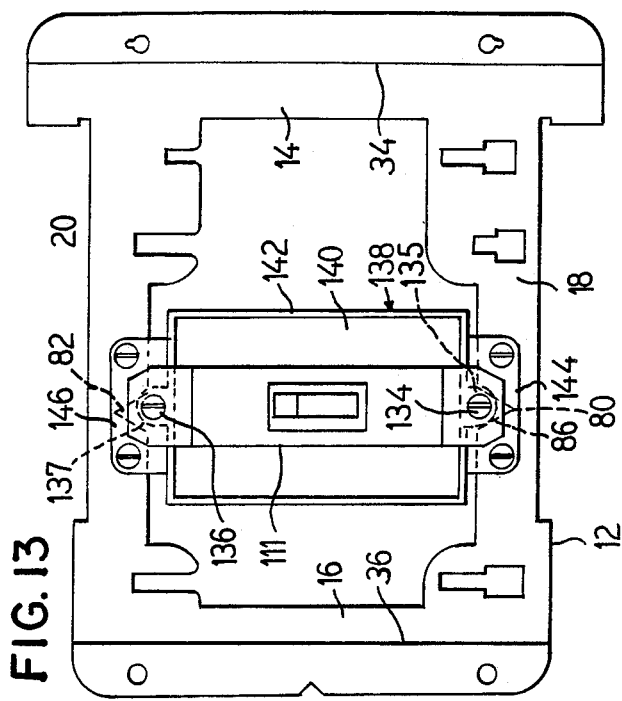
FIG. 13 is a front view of the apparatus of FIG. 12.
Figure 12:
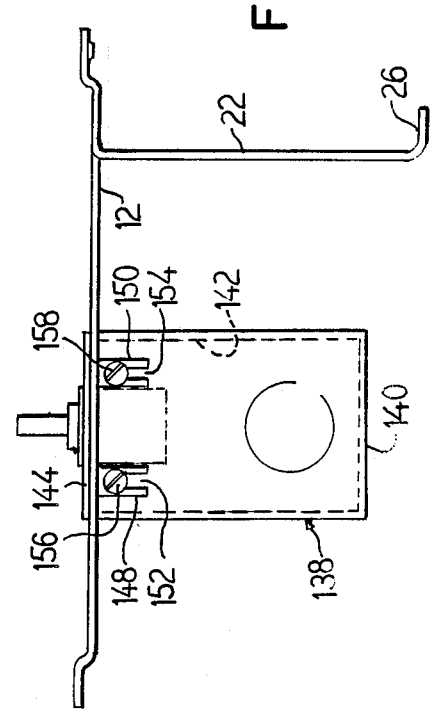
FIG. 12 is a top view of a mounting bracket of the present invention showing a switch box of a different type mounted thereto.

FIGS. 12 and 13 illustrate a structure similar to that of FIGS. 10 and 11 in which a switch box is mounted by mounting ears. In FIGS. 12 and 13, a switch box 138 is provided and includes a bottom 140 and a peripheral wall 142 extending therefrom to form a cavity for receiving a toggle switch. Here, the switch box includes a pair of mounting ears 144, 146. Only the mounting ear 144 has been shown in detail. The mounting ear 144 includes a pair of rearwardly extending feet 148 and 150 having respective slots 152 and 154 therein. A pair of screws 156 and 158 extend through the slots for adjustment of the box 138. As shown in FIG. 13, the mounting screws 134 and 136 of the switch 111 are received in the threaded tabs 135, 137 and clear the mounting bracket by way of the provision of the notches 80 and 82.

Figure 14:
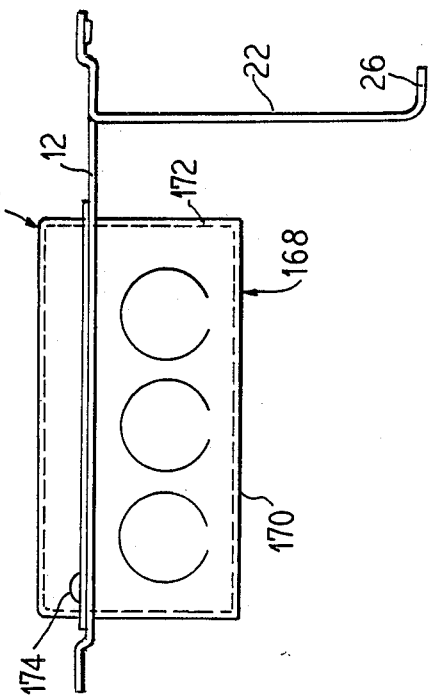
FIG. 14 is a top view of a mounting bracket of the present invention showing an electrical box of the second type and a plaster ring mounted thereto.
Figure 15:
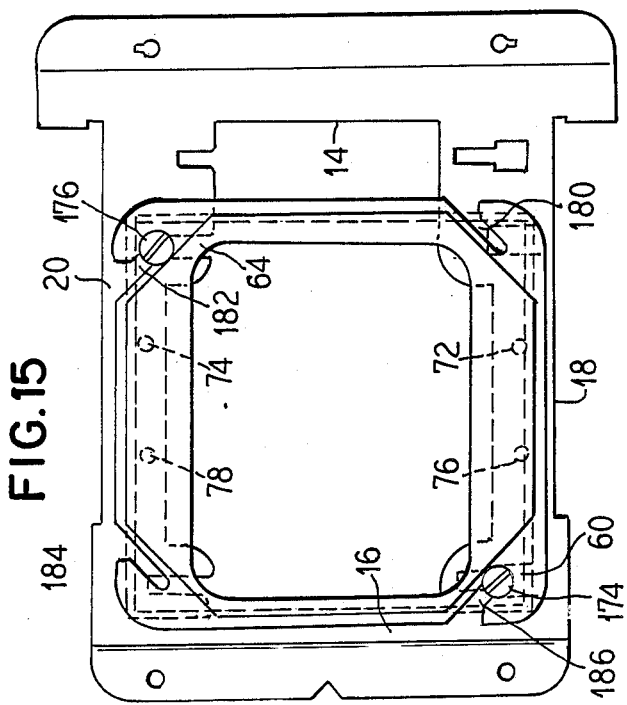
FIG. 15 is a front view of the apparatus of FIG. 14.

FIGS. 14 and 15 illustrate a small electrical box 168 mounted to the mounting bracket and a plaster ring mounted to the front of the mounting bracket. The electrical box 168 includes a bottom 170 and a peripheral wall 172 extending therefrom and having a pair of diagonally located tabs extending from the wall 172 parallel to the bottom 170 and carrying a respective mounting screw 174, 176. The head of the mounting screw 174 is received through the large portion of the slot 60 and the electrical box is moved downwardly so that the shank of the screw 174 is received in the smaller portion of the slot and the shank of the screw 176 is received in the slot 64. The plaster ring 178 includes a plurality of angled slots 180, 182, 184 and 186 in its flange. The plaster ring is moved so that the shank of the mounting screw 176 is received in the slot 182 and the plaster ring is then rotated so that the shank of the mounting screw 174 is received in the slot 186.

As mentioned above, a plurality of electrical boxes of different sizes, with respect to diagonal and depth may be mounted to the rear of the mounting bracket. As also indicated above, and as discussed herein, a variety of outlet and switch boxes may be mounted to the front surface and/or rear surface of the mounting panel so as to accommodate switches, receptacles and the like.

Although we have described our invention by reference to particular illustrative embodiments thereof, many changes and modifications of the invention may become apparent to those skilled in the art without departing from the spirit and scope of the invention. We therefore intend to include within the patent warranted hereon, all such changes and modifications as may reasonably and properly be included within the scope of our contribution to the art.

We claim:

1. A mounting bracket for mounting a switch box to a wall stud within a wall having a pair of opposed wall panels, the switch box including a bottom, a peripheral sidewall extending therefrom to form a cavity, and a pair of threaded tabs, each including a mounting screw therein, extending from said sidewall parallel to said bottom, said bracket comprising:
   a planar mounting panel including opposed first and second sections and opposed third and fourth sections connecting said first and second sections and therewith forming a central opening;
   a pair of stabilizing legs each extending at a right angle from said planar mounting panel and each including a distal end for engaging an opposed wall panel;
   mounting means including a threaded mounting hole in said third section and a threaded mounting hole in said fourth section for receiving the mounting screws of said box to secure said box to said mounting panel; and
   bracket mounting means including a pair of spaced holes in said first section for receiving fasteners to secure said bracket to said stud.

2. A mounting bracket for mounting a switch box to a wall stud which extends between a pair of opposed wall panels, the switch box comprising a bottom, a peripheral sidewall extending from the bottom to form a cavity, a top mounting ear adjustably connected to the sidewall including a pair of threaded holes, and a bottom mounting ear adjustably connected to the sidewall including a pair of threaded holes, said bracket comprising:
   a planar mounting panel including a front surface, a rear surface, opposed first and second sections and opposed third and fourth sections connecting said first and second sections and therewith defining a central opening;
   a pair of stabilizing legs each extending at a right angle from said mounting panel and each including a distal end for engaging an opposed wall panel;
   mounting means including a pair of threaded holes in said third section, a pair of threaded holes in said fourth section and a first pair of mounting screws threadedly engaging said threaded holes of said top mounting ear and said threaded holes of said third section and a second pair of mounting screws threadedly engaging said threaded holes of said bottom mounting ear and said threaded holes of said fourth section; and
   bracket mounting means including a pair of spaced holes in said first section for receiving fasteners for securing said bracket to said stud.

3. A mounting bracket for electrical boxes, said bracket adapted to be mounted to a wall stud between opposed wall panels, said bracket comprising:
   opposed first and second planar sections and opposed third and fourth planar sections connecting said first and second opposed planar sections and therewith defining a central opening;
   a pair of openings through said first section for receiving fasteners to mount said bracket to the stud;
   a pair of legs respectively generally parallel to said third and fourth sections and adapted to be bent at a right angle, each of said legs including a distal end for engaging an opposed wall panel and provide support and stability for said bracket; and
   means in said opposed third and fourth sections for mounting an electrical box thereto.

4. The mounting bracket of claim 3, wherein: said distal end of each of said legs comprises a sub-portion bent at a right angle to said leg.

5. The mounting bracket of claim 3, wherein:
   said first and second sections each include an offset whereby the plane of said panel is recessed with respect to the plane of said first section.

6. The mounting bracket of claim 3, wherein:
   said third and fourth sections each include a profiled edge at said central opening and each of said edges comprises arcuate portions so that there are no sharp edges in said central opening.

7. The mounting bracket of claim 3, in combination with another mounting bracket of the same structure, wherein:
   said second section comprises a pair of holes spaced equal to the spacing of said holes of said first section of other bracket for alignment therewith and for receiving fasteners to secure said brackets together.

8. A mounting bracket for mounting to a wall stud between a front wall panel and a rear wall panel and for mounting an electrical box of the first type which includes a bottom, a plurality of sidewalls extending from the bottom to form a cavity and at least one pair of diagonally disposed threaded mounting tabs extending over the cavity parallel to the bottom and including first threaded fasteners each having a shank and a head, and for mounting an electrical box or a second type which includes a bottom and a plurality of sidewalls extending from the bottom to form a cavity and at least one pair of diagonally disposed threaded mounting tabs extending over the cavity parallel to the bottom and including second threaded fasteners each having a shank and a head, the diagonal spacing of the first threaded fasteners being a first predetermined distance and the diagonal spacing of the second threaded fasteners being a greater, second predetermined distance, said bracket comprising:

a planar mounting panel including opposed first and second sections and opposed third and fourth sections connecting said first and second sections to define a central opening therebetween;

a pair of legs each cut from the material of said third and fourth sections and connected to and extending generally perpendicular to said mounting panel, each of said legs including a distal end for engaging the rear wall panel;

electrical box mounting means comprising a first slot in said third section dimensioned to receive the shank of a threaded fastener therethrough, a second slot in said fourth section including a first portion dimensioned to receive the head of a threaded fastener therethrough and a second portion to receive the shank of the threaded fastener therethrough, said first and second slots spaced equal to the spacing of said first threaded fasteners for mounting an electrical box of the first type, a third slot in said fourth section dimensioned to receive the head of a threaded fastener therethrough and spaced from said first slot equal to the spacing of said second fasteners for mounting an electrical box of the second type;

a first portion of said first section offset from the plane of said mounting panel and including a pair of spaced holes for receiving fasteners for mounting said bracket to the wall stud.

* * * * *